US009727516B2

(12) United States Patent
Glover et al.

(10) Patent No.: US 9,727,516 B2
(45) Date of Patent: Aug. 8, 2017

(54) METHOD FOR POWER CONTROL HANDSHAKING OF HOT SWAPPABLE COMPONENTS USING PROGRAMMABLE LOGIC DEVICES

(71) Applicant: International Business Machines Corporation, Armonk, NY (US)

(72) Inventors: Adrian P. Glover, Katy, TX (US); Brent Yardley, Hillsboro, OR (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 403 days.

(21) Appl. No.: 14/106,226

(22) Filed: Dec. 13, 2013

(65) Prior Publication Data

US 2015/0169492 A1 Jun. 18, 2015

(51) Int. Cl.
*G06F 13/40* (2006.01)
(52) U.S. Cl.
CPC ................. *G06F 13/4081* (2013.01)
(58) Field of Classification Search
CPC .. G06F 13/4081; G06F 13/42; G06F 13/4252; G06F 13/4269; G06F 13/4286
See application file for complete search history.

(56) References Cited

U.S. PATENT DOCUMENTS

| 5,805,837 | A  | * | 9/1998  | Hoover ............... G06F 13/362 710/110 |
| 6,243,829 | B1 | * | 6/2001  | Chan .................. G06F 11/2097 714/5.11 |
| 6,775,254 | B1 |   | 8/2004  | Willenegger et al. |
| 6,851,013 | B1 | * | 2/2005  | Larsen ................ G11C 16/102 365/185.33 |
| 8,065,651 | B2 |   | 11/2011 | Kapur et al. |
| 8,180,961 | B1 | * | 5/2012  | Jiang .................. G06F 21/6227 711/113 |
| 2007/0211622 | A1 | * | 9/2007  | Yamakawa ............ H04L 45/00 370/217 |
| 2007/0260778 | A1 |   | 11/2007 | Lai et al. |
| 2009/0243391 | A1 | * | 10/2009 | Susong, III ............ H02J 1/06 307/66 |

(Continued)

OTHER PUBLICATIONS

Jones, DF et al.; "Bidirectional Interface Test System," IBM Technical Disclosure Bulletin, May 1982, pp. 6557-6559.

(Continued)

*Primary Examiner* — Farley Abad
(74) *Attorney, Agent, or Firm* — Cantor Colburn LLP

(57) ABSTRACT

A system and methodology for effectively managing, without interrupting the overall system, the power and control logic of the system during the removal, insertion and programming of programmable components that control the logic. The system and methodology detect a removal of a first programmable component from its socket and switch at least one control signal from being driven by the first programmable component to being driven by the second programmable component. Upon detecting an insertion of the first programmable component into its socket, the system and methodology switch the at least one control signal from being driven by the second programmable component to being driven by the first programmable component.

18 Claims, 5 Drawing Sheets

(56) References Cited

U.S. PATENT DOCUMENTS

| | | | |
|---|---|---|---|
| 2012/0117562 A1* | 5/2012 | Jess | G06F 9/45558 |
| | | | 718/1 |
| 2012/0221521 A1* | 8/2012 | Chiu | G06F 11/3485 |
| | | | 707/622 |
| 2013/0007019 A1 | 1/2013 | Yanase | |
| 2013/0268705 A1 | 10/2013 | Maji et al. | |

OTHER PUBLICATIONS

Nicholson, Jo et al.; "Control Signals for Input Output Bus of a Microprocessor," IBM Technical Disclosure Bulletin, Sep. 1980, pp. 1607-1609.

Landers, Jr., J.D, et al.; "Power Supply Control via Monitoring of Communications Signals," IBM Technical Disclosure Bulletin, vol. 38, No. 04, Apr. 1995, pp. 463-464.

\* cited by examiner

METHOD FOR POWER CONTROL HANDSHAKING OF HOT SWAPPABLE COMPONENTS USING PROGRAMMABLE LOGIC DEVICES

BACKGROUND

The disclosed embodiments relate in general to removable programmable components. More specifically, the disclosed embodiments relate to managing the ability to hot swap, program and/or reprogram programmable components.

High-availability systems and components, such as servers, network switches, system management functions, redundant-array-of-independent-disk (RAID) storage and other forms of communications infrastructure, need to be designed for near-zero downtime throughout their useful life. If a component of such a system fails or needs updating, it must be replaced without interrupting the rest of the system. In many instance, the failed or outdated board or module will have to be removed—and its replacement plugged in—while the system remains up and running. This process is known as hot swapping , or in some cases hot plugging (where the module interacts with the system software). To facilitate a safe hot swap, connectors may be provided with staggered pins (i.e., at least one pin is shorter than the others). Upon removal of the module, the so-called "short pin" loses contact before all the other pins, thereby providing other devices in the system an advanced warning that the module is being removed. Upon insertion of the module, the longer pins ensure that ground and local power are established before other connections are made. In addition, each printed-circuit board (PCB) or plug-in module has an on-board hot-swap controller to facilitate the safe removal and insertion of the module.

Programmable components present challenges when including them as hot swappable components of a high availability system. For example, where a first programmable component serves as a master to a second programmable component that serves as a slave, hot swapping the first programmable component could effectively shut down the second programmable component. Further, during either reprogramming of the master programmable component, or during replacement and programming of the master programmable component, reprogramming and/or programming will drive signal lines to various states that may or may not be the correct polarity for continued assertion of specific control signals. To avoid interruptions to overall system functionality, programmable component must be capable of being safely reprogrammed, hot swapped and/or programmed.

SUMMARY

The disclosed embodiments include a computer implemented method of controlling at least one first programmable component and at least one second programmable component, the method comprising: identifying a destabilized state of the at least one first programmable component; and switching a driving of at least one control signal of the at least one second programmable component from the at least one first programmable component to the at least one second programmable component. The above-described method may further include: identifying a stabilized state of the at least one first programmable component; and switching said driving of said at least one control signal of the at least one second programmable component from the at least one second programmable component to the at least one first programmable component.

The disclosed embodiments further include a system for controlling at least one first programmable device and at least one second programmable device, the system comprising: a computer system having a processor, the computer system configured to perform a method comprising: identifying a destabilized state of the at least one first programmable component; and switching a driving of at least one control signal of the at least one second programmable component from the at least one first programmable component to the at least one second programmable component. The above-described system may further include: identifying a stabilized state of the at least one first programmable component; and switching said driving of said at least one control signal of the at least one second programmable component from the at least one second programmable component to the at least one first programmable component.

Figure 1:
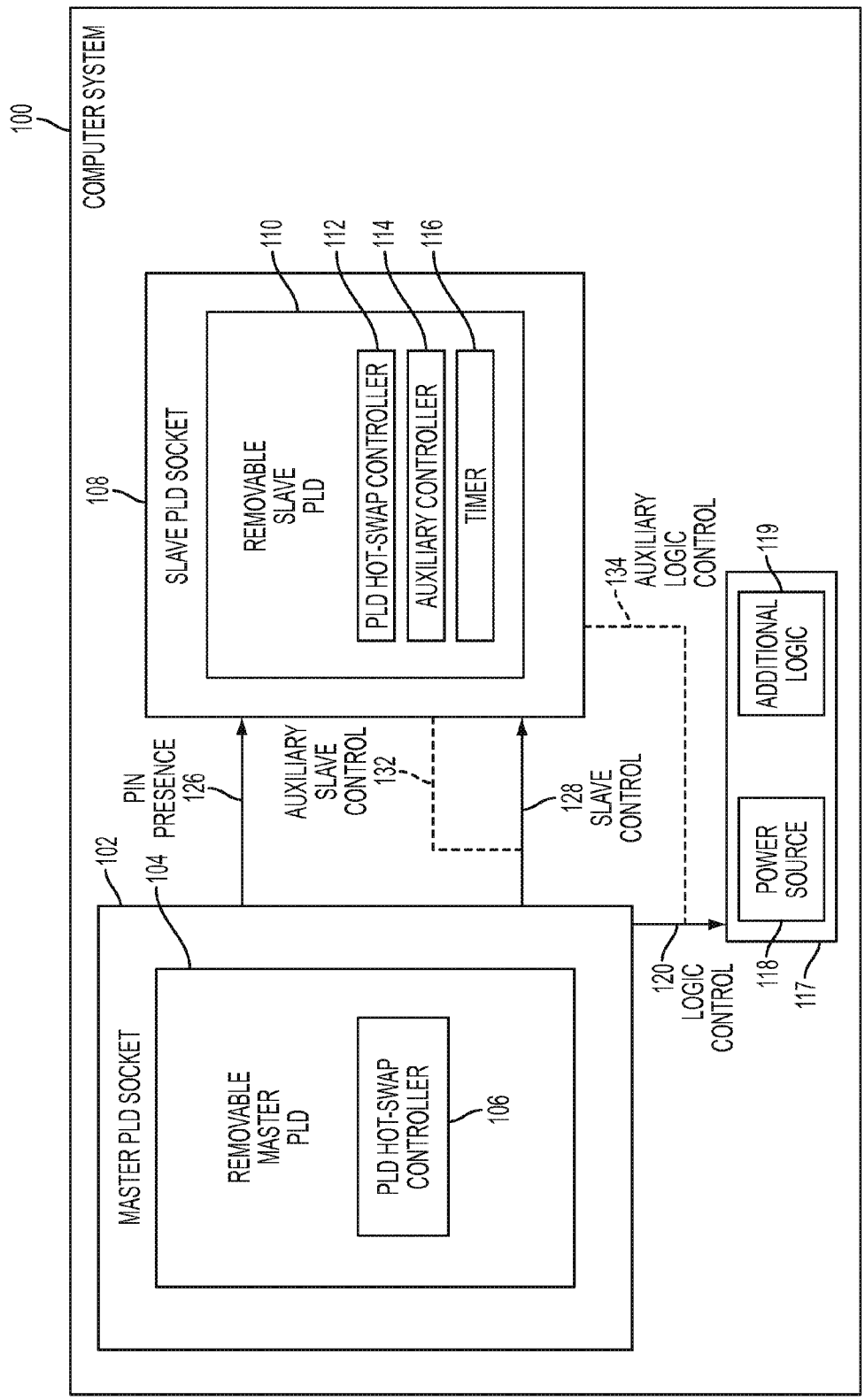
FIG. 1 is a diagram illustrating an example configuration of a computer system that performs a methodology according to the disclosed embodiments, wherein a master programmable logic device (PLD) is inserted into its socket, and the master PLD drives certain control signals of a slave PLD.

In the accompanying figures and following detailed description of the disclosed embodiments, the various elements illustrated in the figures are provided with three-digit reference numbers. The leftmost digit of each reference number corresponds to the figure in which its element is first illustrated.

DETAILED DESCRIPTION

Various embodiments of the present disclosure will now be described with reference to the related drawings. Alternate embodiments may be devised without departing from the scope of this disclosure. Additionally, well-known elements of the disclosed embodiments will not be described in detail or will be omitted so as not to obscure the relevant details of the disclosure.

Turning now to an overview of the present disclosure, the disclosed embodiments provide systems and methodologies by which a handshake occurs between hot swappable components. An example configuration for the hot swappable components includes a first programmable component acting as a master to a second programmable component acting as a slave. When the master hot swappable, programmable component is inserted in its socket, programmed and stabilized, it drives control and state signals of the slave hot swappable, programmable component. When the master hot swappable, programmable component is removed from its socket, multi-directional control and state lines implement soft switch and presence detect functions to reverse the direction of control signaling such that the slave hot swappable, programmable component takes ownership of driving and controlling the control and state signals of the slave hot swappable, programmable component. When the master hot swappable, programmable device is re-inserted in its socket, timing functions may be implemented to delay switching control of the multi-directional lines back to the master hot swappable, programmable device until the master device is functional and able to take over ownership of signals on the multi-directional lines.

Continuing with an overview of the present disclosure, each of the hot swappable, programmable devices has the presence signals for each subsystem wired into the input pins of the devices. Upon presence removal, the logic control signals that are normally read by the slave hot-swappable, programmable device that remains present are immediately reversed to an output signal based on current state as an input signal. This becomes the state save and re-drive portion of the disclosed embodiment. As long as the master hot swappable, programmable device is identified as not present, the remaining slave programmable device owns the assertion of the logic control signals. When the master hot swappable, programmable device is identified as present, the previously described system timing function may be engaged. As an alternative to the use of a timing function, after programming of the master hot-swappable, programmable device has completed, a predetermined signaling sequence may be sent to the slave hot-swappable, programmable device to indicate that the master device is ready to take back ownership of the logic control signals.

Figure 2:
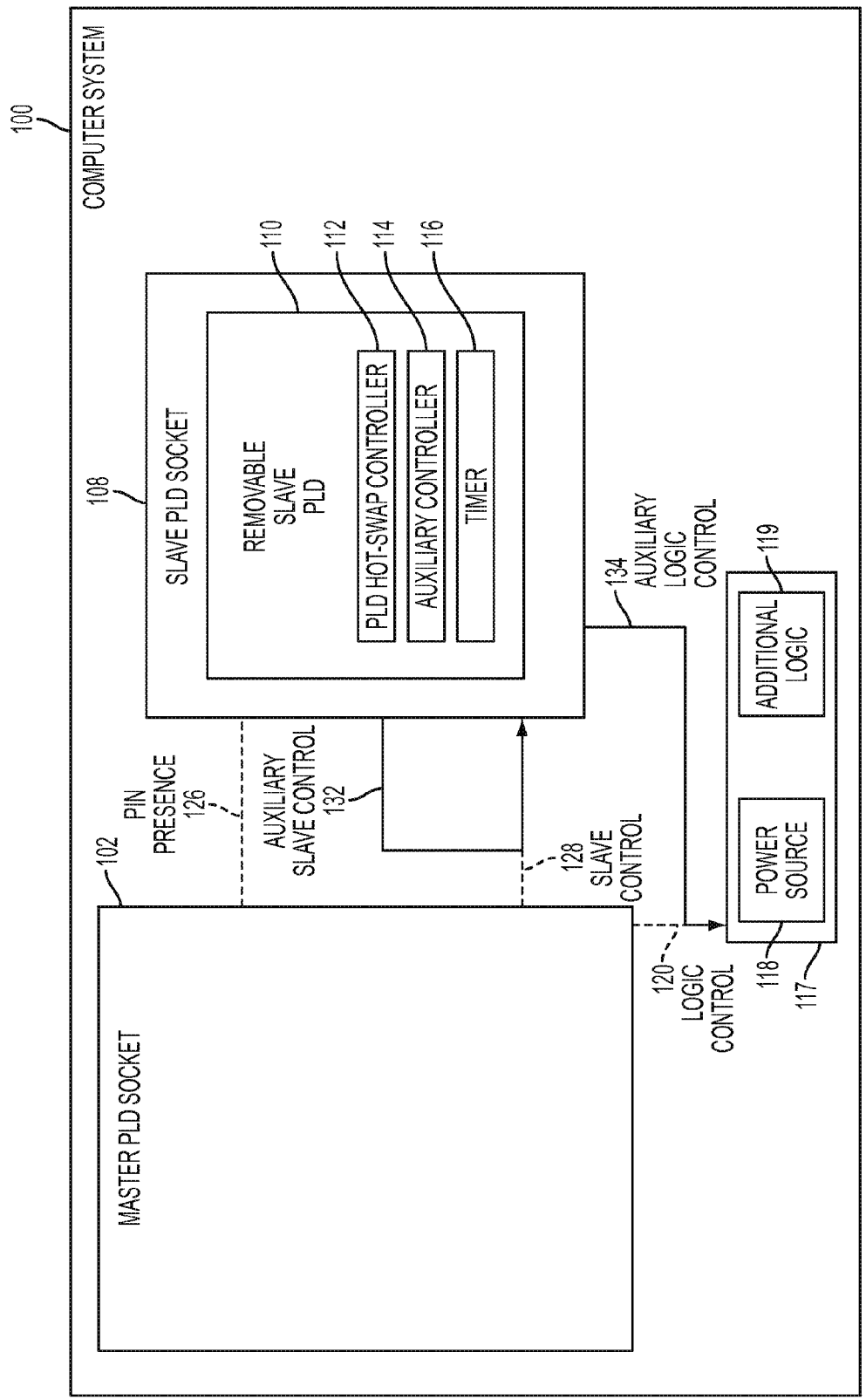
FIG. 2 is a diagram illustrating the computer system of FIG. 1, wherein the master PLD has been removed from its socket, and wherein certain control signals have been switched from being driven by the master PLD to being driven by the slave PLD.
Figure 3:
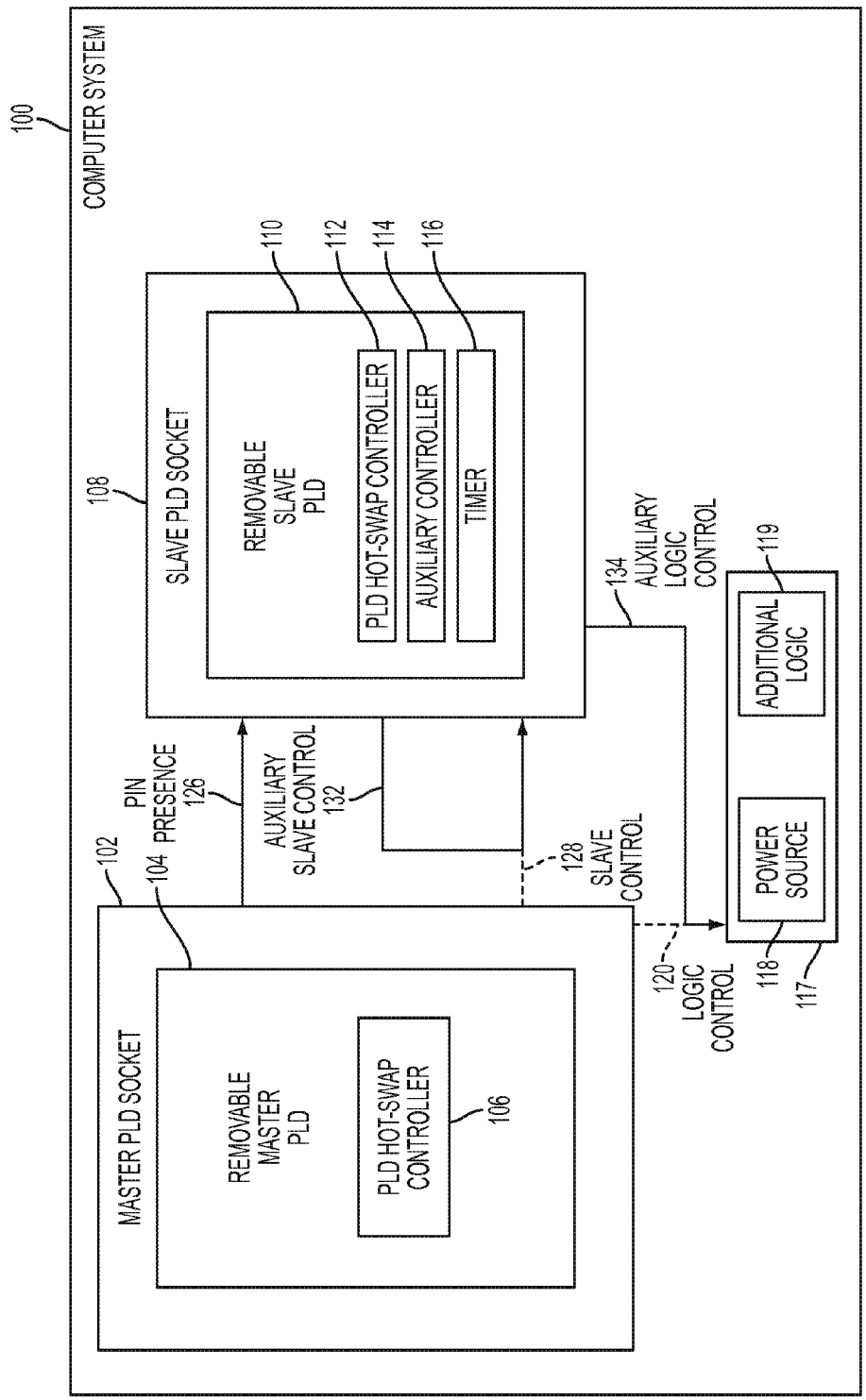
FIG. 3 is a diagram illustrating the computer configuration of FIGS. 1 and 2, wherein the master PLD has been inserted into its socket, the master PLD is in the process of being programmed and certain control signals have not yet been switched from being driven by the slave PLD to being driven by the master PLD.

Turning now to a more detailed description of the disclosed embodiments, FIGS. 1-3 illustrate an embodiment of the present disclosure in three states. FIG. 1 illustrates a computer system 100 wherein a master programmable logic device (PLD) 104 is connected to a master PLD socket 102. FIG. 2 illustrates computer system 100 of FIG. 1 wherein master PLD 104 has been removed from master PLD socket 102 and certain control signals (e.g., 132, 134) have been switched or handed off from being driven by master PLD 104 to being driven by a slave PLD 110. FIG. 3 illustrates computer system 100 of FIGS. 1 and 2 wherein master PLD 104 has been inserted into its socket 102, master PLD 104 is in the process of being programmed and stabilized, and a timer 116 has not yet allowed control lines 132, 134 to be switched or handed off from being driven by slave PLD 110 to being driven by master PLD 104. As an alternative to timer 116, after programming of master PLD 104 has completed, a predetermined signaling sequence may be sent to slave PLD 110 to indicate that master PLD 104 is ready to take back ownership of the control and/or logic signals.

Before beginning a detailed description of the FIGS., it should be noted that FIGS. 1-5 illustrate one example configuration and methodology of the computer system 100, and a variety of configurations may be developed in accordance with the overall functionality described in the present disclosure. For example, although PLDs are shown, the present disclosure is applicable to any programmable component having a programming period during which output signals to the components are either deterministic or non-deterministic, and during which the output signals cannot be used for driving logic associated with remote domains. Further, the auxiliary control signals include an auxiliary slave control signal 132 and/or an auxiliary logic control signal 134, but may also include a variety of other control signals that govern the operation of the illustrated PLDs. Both the illustrated configuration and contemplated extensions thereof may be embodied in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. Accordingly, the disclosed embodiments can include a computer readable media embodying a method for performing the disclosed and claimed embodiments.

As shown in FIG. 1, the computer system 100 includes a removable master PLD 104, a master PLD socket 102, a PLD hot-swap controller 106, a removable slave PLD 110, a slave PLD socket 108, a PLD hot-swap controller, an auxiliary controller 114, a timer 116, general logic 117, a power source 118, additional logic 119, logic control line 120, a pin presence line 126, a slave control line 128, an auxiliary slave control line 132 and an auxiliary logic control line 134, configured as shown. Master PLD 104 may be implemented as a field programmable logic array (FPLA), and slave PLD 110 may be implemented as a complex programmable logic array (CPLA). PLD hot swap controller 106 controls hot swap functionality of master PLD 104, and PLD hot swap controller 112 and auxiliary controller 114 control hot swap functionality of slave PLD 110. Master PLD 104 may include one or more programmable units, and slave PLD 110 may include one or more programmable units. For example, computer system 100 could include a one to many configuration wherein at least one master PLD controls several slave PLDs, Additional logic 119 represents any logic not part of master PLD 104 and/or slave PLD 110 that is being directed by the signals that interact between PLDs. Power source 118 provides power to the removable hot-swappable devices 104, 110. Master PLD 104, when inserted in master PLD socket 102, programmed and stabilized, enables general logic 117 (including power source 118 and additional logic 119) via logic control line 120 and provides various control signals to slave PLD 110 via slave control line 128. Although logic control line 120 and slave control line 128 are illustrated as single lines, they may be implemented as a network of lines and connections that route control signals to the appropriate device(s).

The multi-directional nature of certain signal lines (e.g., 120, 128, 132, 134) shown in FIGS. 1-3 are illustrated by solid lines, dotted lines and directional arrows. A solid line illustrates that signals on the line are actively being driven, and the directional arrow identifies the component that is driving the signals on the solid line. Alternatively, a dotted line illustrates a line that is not being actively driven. FIG. 1 shows pin presence line 126 as a solid line with a directional arrow from master PLD socket 102 into slave PLD socket 108. This means that pin presence line 126 is active and being driven by master PLD 104. Thus, master PLD 104 is inserted in master PLD socket 102. FIG. 1 shows slave control line 128 as a solid line with a directional arrow from master PLD socket 102 into slave PLD socket 108. This means that signals on the slave control line 128 are actively and being driven by master PLD 104. FIG. 1 shows logic control line 120 as a solid line with a directional arrow from master PLD socket 102 into general logic 117. Thus, signals on logic control line 120 are actively being driven by master PLD 104. FIG. 1 shows both auxiliary slave control line 132 and auxiliary logic control line 134 as dotted lines. Thus, for the configuration shown in FIG. 1 wherein master PLD 104 is inserted into master PLD socket 102, both auxiliary slave control line 132 and auxiliary logic control line 134 are not actively being driven.

Continuing with a description of the multi-directional signal lines, FIG. 2 shows computer system 100 after master PLD 104 has been removed from master PLD socket 102. FIG. 2 shows pin presence line 126 as a dotted line with no directional arrow. This means that pin presence line 126 is inactive and not being driven by master PLD 104. Thus, master PLD 104 is removed from master PLD socket 102. FIG. 2 shows slave control line 128 as a dotted line with no directional arrow from master PLD socket 102. Thus, signals on slave control line 128 are not actively and being driven by master PLD 104. FIG. 2 shows logic control line 120 as a dotted line with no directional arrow from master PLD socket 102. Thus, signals on logic control line 120 are not actively being driven by master PLD 104. FIG. 2 shows auxiliary slave control line 132 as a solid line with a directional arrow from slave PLD socket 108 looped back into slave PLD socket 108. Thus, for the configuration shown in FIG. 2 wherein master PLD 104 has been removed from master PLD socket 102, slave PLD 110 (via slave PLD socket 108) has taken over control of its own control signal through control of auxiliary slave control line 132 and is actively driving it. FIG. 2 also shows auxiliary logic control line 134 as a solid line with a direction arrow from slave PLD socket 108 into general logic 117. Thus, for the configuration shown in FIG. 2 wherein master PLD 104 has been removed from master PLD socket 102, slave PLD 110 (via slave PLD socket 108) has taken over control of its own logic control signal through control of auxiliary logic control line 134.

FIG. 3 shows computer system 100 after master PLD 104 has been reinserted into PLD socket 102 but is not yet programmed and stabilized. The signal lines 120, 128, 132, 134 of FIG. 3 are substantially the same as show in FIG. 2. However, pin presence line 126 is again a solid line with a directional arrow from master PLD socket 102 into slave PLD socket 108 to indicate that pin presence line 126 is active and being driven by master PLD 104. Thus, master PLD 104 has been reinserted into master PLD socket 102. As will be described in more detail later in this disclosure, the configuration shown in FIG. 3 lasts for a predetermined time, after which the computer system 100 returns to the configuration shown in FIG. 1. This allows time for programming of master PLD 104 to complete and for signals on lines 120, 126, 128, 132, 134 to stabilize before control of lines 120, 128, 132, 134 is handed back to master PLD 104.

Figure 4:
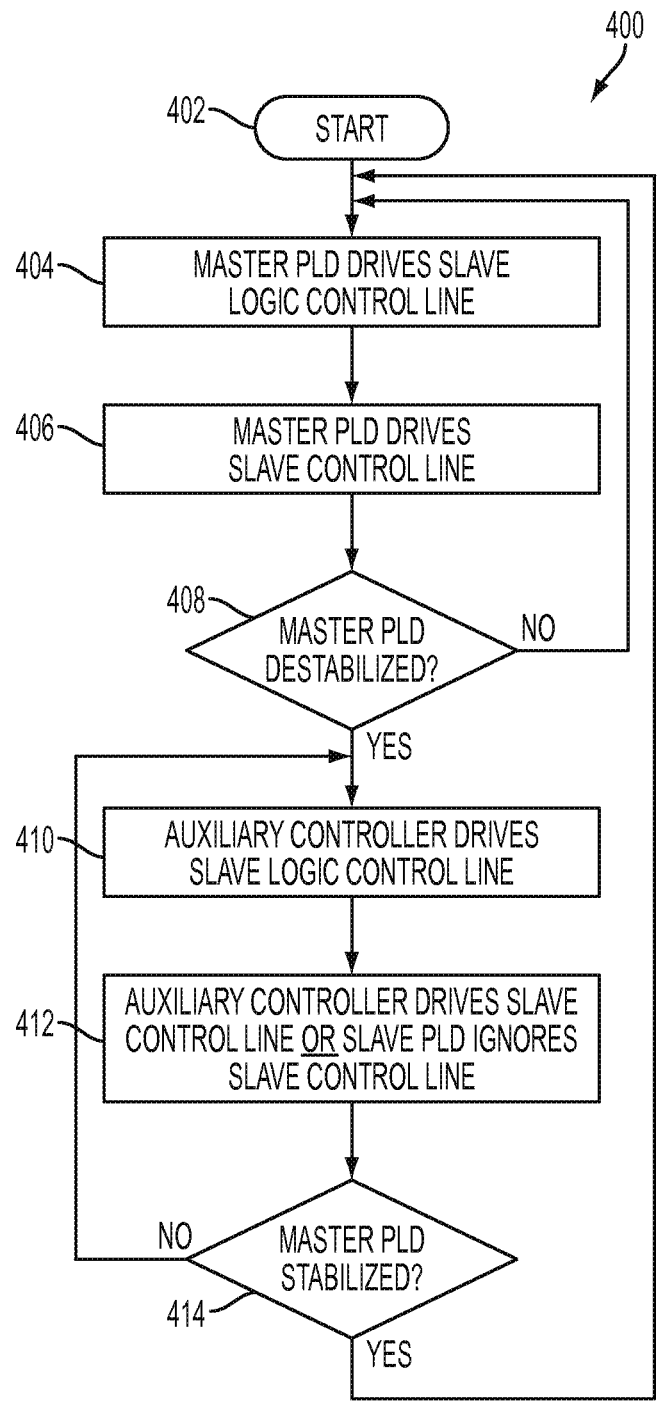
FIG. 4 is a flow diagram illustrating an example of a methodology according to the disclosed embodiments.
Figure 5:
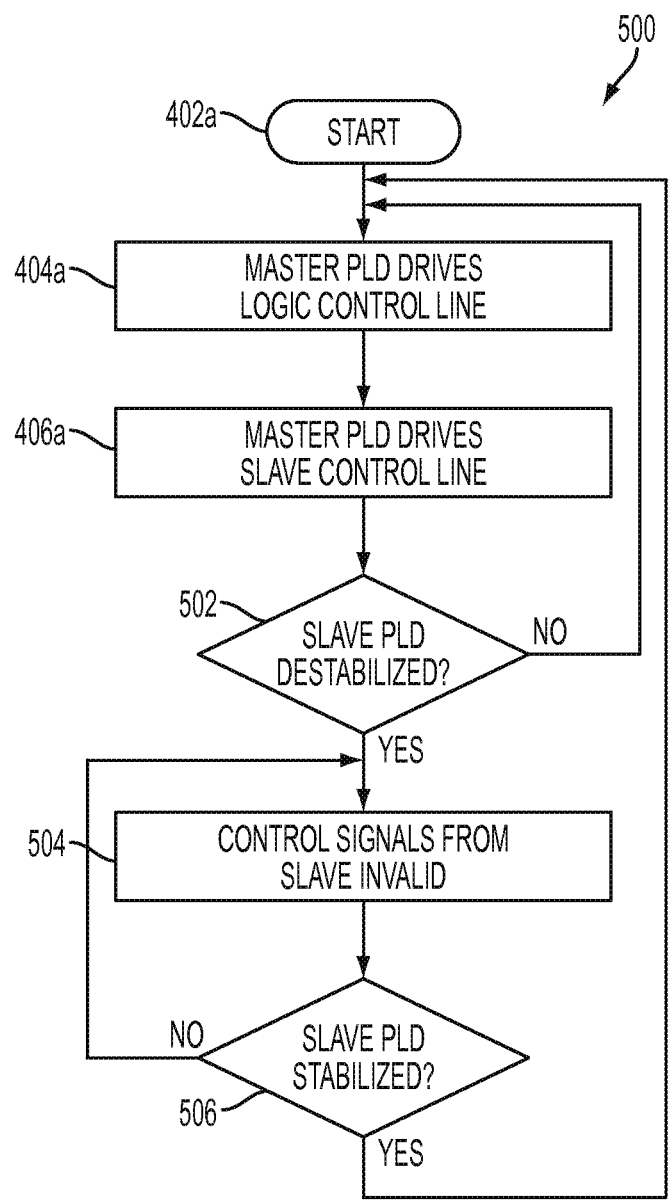
FIG. 5 is a flow diagram illustrating another example of a methodology according to the disclosed embodiments.

FIGS. 4 and 5 are flow diagrams illustrating methodologies 400, 500 according to the disclosed embodiments. Methodology 400 illustrates an example wherein master PLD 104 becomes destabilized, and methodology 500 illustrates an example wherein slave PLD 110 becomes destabilized. Methodologies 400, 500 are described in terms of actions to be performed by, for example, elements of a computing device (e.g., the computer system 100 in FIGS. 1-3). Although methodologies 400, 500 may be implemented by the computer system 100 shown in FIGS. 1-3, the illustrated computer configurations are merely examples, and a wide variety of computer configurations are within the scope of this disclosure. It will be recognized that various operations of methodologies 400, 500 may be performed by specific circuits (e.g., application specific integrated circuits (ASICs)), by program instructions being executed by one or more processors, or by a combination of both. Additionally, the sequence of actions described herein can be considered to be embodied entirely within any form of computer readable storage medium having stored therein a corresponding set of computer instructions that upon execution would cause an associated processor to perform the functionality described herein. Thus, the various aspects of methodologies 400, 500 may be embodied in a number of different forms, all of which have been contemplated to be within the scope of the claimed subject matter.

Referring to FIG. 4, including reference back to certain corresponding elements shown in FIGS. 1-3 where appropriate, methodology 400 begins at block 402 where various system functionality is established, including stabilization of master PLD 104 and slave PLD 110. Methodology 400 then moves to blocks 404, 406 where master PLD 104 drives at least one control signal of slave PLD 110. In the disclosed embodiment, the at least one control signal may include one or both of the control signals on logic control line 120 and slave control line 128. Blocks 404, 406 represent the configuration shown in FIG. 1 wherein master PLD 104 is inserted in master PLD socket 102, all programming of master PLD 104 has been completed, and all control signals being driven by master PLD 104 have been stabilized.

Decision block 408 determines whether master PLD 104 has been destabilized such that master PLD 104 can no longer achieve a correct asserted state. Destabilization may result from several occurrences including reprogramming the master PLD without removal and/or removing the master PLD from its socket, inserting a new master PLD and programming the new master PLD. Decision block 408 may determine whether master PLD 104 is being programmed by an operation that generates signals indicating that the reprogramming and/or programming of master PLD 104 is about to begin. Block 408 may determine whether master PLD 104 has been removed from master PLD socket 102 by detecting on pin presence line 126 whether a so-called "short pin" of master PLD 104 has been removed from master PLD socket 102. As previously described, to facilitate a successful hot swap, connectors between master PLD 104 and master PLD socket 102 may be provided with staggered pins (i.e., at least one pin is shorter than the others). Upon removal of master PLD 104, the "short pin" loses contact before all the other pins, thereby providing other devices in the computer system 100 with an advanced warning that master PLD 104 is being removed. If the result of the inquiry at decision block 408 is no, master PLD 104 has not been destabilized, and methodology 400 returns to block 404. If the result of the inquiry at decision block 408 is yes, methodology 400 moves to blocks 410, 412, wherein, master PLD 104 hands off the driving of the previously described at least one control signal to slave PLD 110 before master PLD 104 is destabilized. This hand off is represented in FIGS. 1 and 2 by switching slave control line 128 and logic control line 120 (as represented by FIG. 1) to auxiliary slave control line 132 and auxiliary logic control line 134 (as represented by FIG. 2). In the disclosed embodiment, the at least one control signal may include one or both of the control signals on logic control line 120 and slave control line 128. Thus, blocks 410, 412 correspond to the configurations shown in FIG. 2 wherein master PLD 104 is either being removed or has been removed from master PLD socket 102, as well as FIG. 3 wherein master PLD 104 is being either reprogrammed or programmed.

Decision block 414 determines whether master PLD 104 has been has been stabilized such that master PLD 104 can achieve a correct asserted state. Stabilization may result from several occurrences including the completion of reprogramming the master PLD without removal and/or, after removal of the master PLD from its socket, inserting a new master PLD and completing programming of the new master PLD. Block 414 may determine whether master PLD 104 has completed programming and/or reprogramming by an operation that generates signals indicating that the reprogramming and/or programming has completed. Block 414 may also determine whether master PLD has stabilized by determining whether master PLD 104 has been inserted into master PLD socket 102 by detecting on pin presence line 126 whether a so-called "long pin" of master PLD 104 has been inserted into master PLD socket 102. As previously described, to facilitate a safe hot swap, connectors between master PLD 104 and master PLD socket 102 may be provided with staggered pins (i.e., at least one pin is shorter than the others). Upon removal of master PLD 104, the "short pin" loses contact before all the other pins, thereby providing other devices in the computer system 100 with an advanced warning that master PLD 104 is being removed. Upon insertion of master PLD 104, the longer pins make contact before the short pin, thereby providing other devices in the computer system 100 with advanced warning that master PLD 104 is being inserted. Block 414 may also initialize timer 116 (shown in FIGS. 1-3) and determine whether timer 116 has timed out. The wait period of timer 116 is chosen to allow sufficient time for master PLD 104 to be programmed and stabilized such that master PLD 104 can take over the driving of signals via slave control line 128 and logic control line 130. Although some delay is provided by the use of staggered pins, this delay is typically insufficient to ensure that the programming of master PLD 104 has been completed and stabilized before allowing slave PLD 110 to hand off driving the previously described at least one control signal to master PLD 104. This hand off is represented in FIG. 3 and FIG. 1 by switching from auxiliary slave control line 132 and auxiliary logic control line 134 (as represented by FIG. 3) to slave control line 128 and logic control line 120 (as represented by FIG. 1).

Referring now to FIG. 5, including reference back to certain corresponding elements shown in FIGS. 1-3 where appropriate, methodology 500 begins at block 402a where various system functionality is established, including stabilization of master PLD 104 and slave PLD 110. Methodology 500 then moves to blocks 404a, 406a where master PLD 104 drives at least one control signal of slave PLD 110. In the disclosed embodiment, the at least one control signal may include one or both of the control signals on logic control line 120 and slave control line 128. Blocks 404a, 406a represent the configuration shown in FIG. 1 wherein master PLD 104 is inserted in master PLD socket 102, slave PLD 110 is inserted in slave PLD socket 108, all programming of PLDs 104, 110 have been completed, and all control signals being driven by master PLD 104 and/or slave PLD 110 have been stabilized.

Decision block 502 determines whether slave PLD 110 has been destabilized such that slave PLD 110 can no longer achieve a correct asserted state. Destabilization may result from several occurrences including reprogramming the slave PLD without removal and/or removing the slave PLD from its socket, inserting a new slave PLD and programming the new slave PLD. Decision block 502 may determine whether slave PLD 110 is being programmed by an operation that generates signals indicating that the reprogramming and/or programming of slave PLD 110 is about to begin. Decision block 502 may determine whether slave PLD 110 has been removed from slave PLD socket 108 by detecting on pin presence line 126 whether a so-called "short pin" of slave PLD 110 has been removed from slave PLD socket 108. As previously described, to facilitate a successful hot swap, connectors between slave PLD 110 and slave PLD socket 108 may be provided with staggered pins (i.e., at least one pin is shorter than the others). Upon removal of slave PLD 110, the "short pin" loses contact before all the other pins, thereby providing other devices in the computer system 100 with an advanced warning that slave PLD 110 is being removed. If the result of the inquiry at decision block 502 is no, slave PLD 110 has not been destabilized, and methodology 500 returns to block 404a. If the result of the inquiry at decision block 502 is yes, methodology 500 moves to block 504 and executes an operation that effectively invalidates signals from slave PLD 110.

From block 504, methodology 500 moves to decision block 506 and determines whether slave PLD 110 has been stabilized such that slave PLD 110 can achieve a correct asserted state. Stabilization may result from several occurrences including the completion of reprogramming the slave PLD without removal and/or, after removal of the slave PLD from its socket, inserting a new slave PLD and completing programming of the new slave PLD. Decision block 506 may determine whether slave PLD 110 has completed programming and/or reprogramming by an operation that generates signals indicating that the reprogramming and/or programming has completed. Decision block 506 may also determine whether slave PLD has stabilized by determining whether slave PLD 110 has been inserted into slave PLD socket 108 by detecting on pin presence line 126 whether a so-called "long pin" of slave PLD 110 has been inserted into slave PLD socket 108. As previously described, to facilitate a safe hot swap, connectors between slave PLD 110 and slave PLD socket 108 may be provided with staggered pins (i.e., at least one pin is shorter than the others). Upon removal of slave PLD 104, the "short pin" loses contact before all the other pins, thereby providing other devices in the computer system 100 with an advanced warning that slave PLD 110 is being removed. Upon insertion of slave PLD 110, the longer pins make contact before the short pin, thereby providing other devices in the computer system 100 with advanced warning that slave PLD 110 is being inserted. Decision block 506 may also initialize a system timer (not shown) and determine whether the timer timed out. The wait period of the system timer is chosen to allow sufficient time for slave PLD 110 to be programmed and stabilized such that slave PLD 110 can now generate valid signals. Although some delay is provided by the use of staggered pins, this delay is typically insufficient to ensure that the programming of slave PLD 110 has been completed and stabilized before allowing slave PLD 110 signals to be valid again.

The disclosed embodiments have been described with reference to the drawings. However, the scope of this disclosure is not limited to the disclosed embodiments. Without departing from the scope of the present disclosure, the disclosed embodiments may be implemented by making a variety of improvements, corrections, and modifications to the disclosed embodiments on the basis of knowledge that persons skilled in the art have.

The word "example" is used herein to mean "serving as an instance or illustration." Any embodiment described herein as an "example" is not necessarily to be construed as preferred or advantageous over other embodiments Likewise, the term "embodiments" does not require that all embodiments include the discussed feature, advantage or mode of operation.

The terms "comprises," "comprising," "includes" and/or "including", when used herein, specify the presence of stated features, integers, operations, elements, and/or components, but do not preclude the presence or addition of one or more other features, integers, operations, elements, components, and/or groups thereof.

Further, many embodiments are described in terms of sequences of actions to be performed by, for example, elements of a computing device. It will be recognized that various actions described herein can be performed in a varying sequence, and the particular order of the disclosed actions may be rearranged where appropriate without departing from the scope of the claimed subject matter.

What is claimed is:

1. A computer implemented method of controlling at least one first programmable component and at least one second programmable component, the method comprising:
   identifying a destabilized state of the at least one first programmable component;
   wherein, prior to the destabilized state of the at least one first programmable component, the at least one first programmable component drives at least one of multiple, control signals that feeds into and controls the at least one second programmable component;
   wherein identifying the destabilized state of the at least one first programmable component comprises an analysis of any one of the multiple control signals that is driven by the at least one first programmable component and feeds into and controls the at least one second programmable component; and
   switching the driving of said at least one of multiple control signals that feeds into and controls the at least one second programmable component from the at least one first programmable component to the at least one second programmable component.

2. The method of claim 1 further comprising:
   identifying a stabilized state of the at least one first programmable component; and
   switching said driving of said at least one of multiple control signal that feeds into and controls the at least one second programmable component from the at least one second programmable component to the at least one first programmable component.

3. The method of claim 2 wherein:
   said destabilized state comprises reprogramming the at least one first programmable component; and
   said stabilized state comprises completing said reprogramming.

4. The method of claim 2 wherein:
   said destabilized state comprises a removal of the at least one first programmable component from a socket; and
   said stabilized state comprises insertion of the at least one first programmable component into said socket and completion of a reprogramming of the at least one first programmable component.

5. The method of claim 2 wherein the at least one first programmable component comprises a first programmable logic device (PLD).

6. The method of claim 5 wherein the at least one second programmable component comprises a second PLD.

7. The method of claim 6 wherein:
   said first PLD acts as a master to said second PLD; and
   said second PLD acts as a slave to said first PLD.

8. The method of claim 2 further comprising:
   identifying a destabilized state of the at least one second programmable component; and
   invalidating signals of the at least one second programmable component in response to said identifying of a destabilized state of the at least one second programmable component.

9. The method of claim 1 further comprising:
   prior to the destabilized state of the at least one first programmable component, the at least one first programmable component drives at least one second control signal of the at least one second programmable component; and
   switching the driving of said at least one second control signal of the at least one second programmable component from the at least one first programmable component to the at least one second programmable component;
   wherein said at least one second control signal of the at least one second programmable component comprises a logic control signal.

10. A system for controlling a first programmable device and a second programmable device, the system comprising:
    a computer system having a processor, the computer system configured to perform a method comprising:
    identifying a destabilized state of the at least one first programmable component;
    wherein, prior to the destabilized state of the at least one first programmable component, the at least one first programmable component drives at least one of multiple control signals that feeds into and controls the at least one second programmable component;
    wherein identifying the destabilized state of the at least one first programmable component comprises an analysis of any one of the multiple control signals that is driven by the at least one first programmable component and feeds into and controls the at least one second programmable component; and
    switching the driving said at least one of multiple control signals that feeds into and controls the at least one second programmable component from the at least one first programmable component to the at least one second programmable component.

11. The system of claim 10 further comprising:
    identifying a stabilized state of the at least one first programmable component; and
    switching said driving of said at least one of multiple control signals that feeds into and controls the at least one second programmable component from the at least one second programmable component to the at least one first programmable component.

12. The method of claim 11 wherein:
    said destabilized state comprises reprogramming the at least one first programmable component; and
    said stabilized state comprises completing said reprogramming.

13. The method of claim 11 wherein:
    said destabilized state comprises a removal of the at least one first programmable component from a socket; and
    said stabilized state comprises insertion of the at least one first programmable component into said socket and completion of a reprogramming of the at least one first programmable component.

14. The method of claim 11 wherein the at least one first programmable component comprises a first programmable logic device (PLD).

15. The system of claim 14 wherein the at least one second programmable component comprises a second PLD.

16. The system of claim 15 wherein:
said first PLD acts as a master to said second PLD; and
said second PLD acts as a slave to said first PLD.

17. The system of claim 11 further comprising:
identifying a destabilized state of the at least one second programmable component; and
invalidating signals of the at least one second programmable component in response to said identifying of a destabilized state of the at least one second programmable component.

18. The method of claim 10 further comprising:
prior to the destabilized state of the at least one first programmable component, the at least one first programmable component drives at least one second control signal of the at least one second programmable component; and
switching the driving of said at least one second control signal of the at least one second programmable component from the at least one first programmable component to the at least one second programmable component;
wherein said at least one second control signal of the at least one second programmable component comprises a logic control signal.

* * * * *